United States Patent [19]
Auinger et al.

[11] Patent Number: 5,783,891
[45] Date of Patent: Jul. 21, 1998

[54] BRUSHLESS SYNCHRONOUS MACHINE

[75] Inventors: Herbert Auinger, Nürnberg; Jürgen Bredthauer; Bernhard Wachta, both of Berlin, all of Germany

[73] Assignee: Siemens Aktiengesellschaft, Munich, Germany

[21] Appl. No.: 513,839

[22] PCT Filed: Feb. 28, 1994

[86] PCT No.: PCT/DE94/00231

§ 371 Date: Oct. 23, 1995

§ 102(e) Date: Oct. 23, 1995

[87] PCT Pub. No.: WO94/21031

PCT Pub. Date: Sep. 15, 1994

[30] Foreign Application Priority Data

Mar. 2, 1993 [DE] Germany .................. 43 07 268.2

[51] Int. Cl.⁶ .................................. H02K 19/26
[52] U.S. Cl. ............... 310/180; 322/68; 322/59; 310/179; 310/182; 310/210
[58] Field of Search .................. 310/179, 180, 310/182, 198, 210, 184; 322/25, 68

[56] References Cited

U.S. PATENT DOCUMENTS

| | | | |
|---|---|---|---|
| 1,478,012 | 12/1923 | Varley | 310/182 |
| 3,132,296 | 5/1964 | Nippes | 322/58 |
| 3,479,543 | 11/1969 | Drexler | 310/162 |
| 3,676,764 | 7/1972 | Syverson | 322/51 |
| 3,757,182 | 9/1973 | Chalmers et al. | 318/186 |
| 3,930,175 | 12/1975 | Chirgwin | 310/160 |
| 3,934,163 | 1/1976 | Mailfert | 310/10 |
| 4,121,148 | 10/1978 | Platzer | 322/59 |
| 4,314,194 | 2/1982 | Severing | 322/89 |
| 4,477,767 | 10/1984 | Cotzas | 310/198 |
| 4,563,606 | 1/1986 | Fukasawa et al. | 310/208 |
| 4,728,879 | 3/1988 | Rounce | 322/25 |
| 5,225,729 | 7/1993 | Yang | 310/206 |

FOREIGN PATENT DOCUMENTS

| | | | |
|---|---|---|---|
| 27 14 188 | 11/1977 | Germany | H02K 19/38 |
| 2 011 186 | 7/1979 | United Kingdom | H02K 19/26 |
| 2071430 | 9/1981 | United Kingdom | 322/68 |

Primary Examiner—Thomas M. Dougerty
Assistant Examiner—B. Mullins
Attorney, Agent, or Firm—Kenyon & Kenyon

[57] ABSTRACT

A brushless synchronous machine, for example a synchronous generator, having an exciter, whose field excitation winding is powered via a regulator connected to a separate auxiliary winding in the stator of the main machine in which the auxiliary winding has a number of phases that differs from the harmonic number of the harmonic wave that is the strongest in the event of a short circuit. In the case of a strong third harmonic wave, the auxiliary winding has a four- or five-phase design.

9 Claims, 5 Drawing Sheets

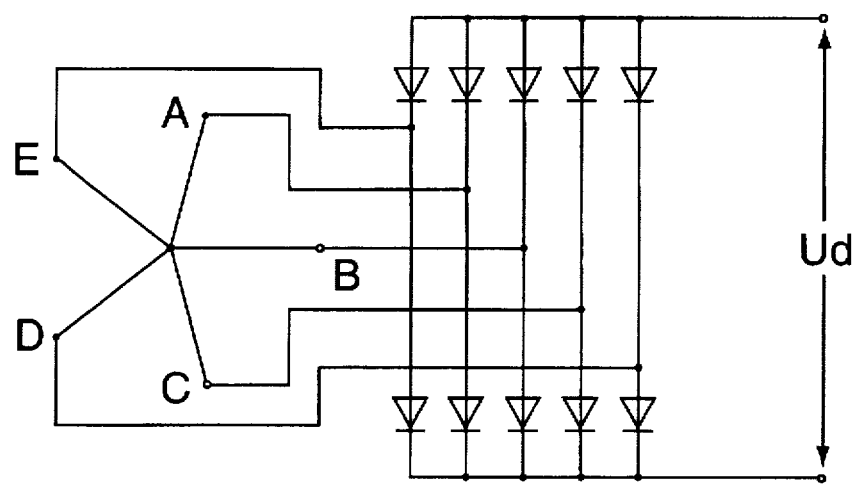
FIG. 1B
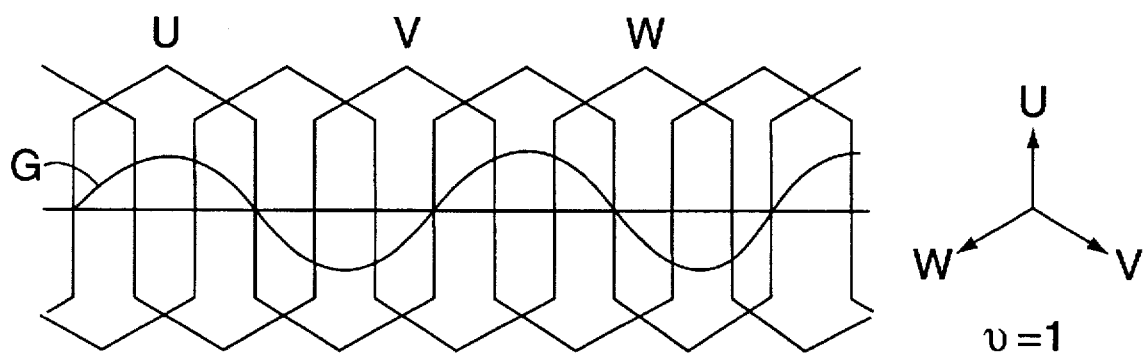
FIG. 2A
FIG. 2C
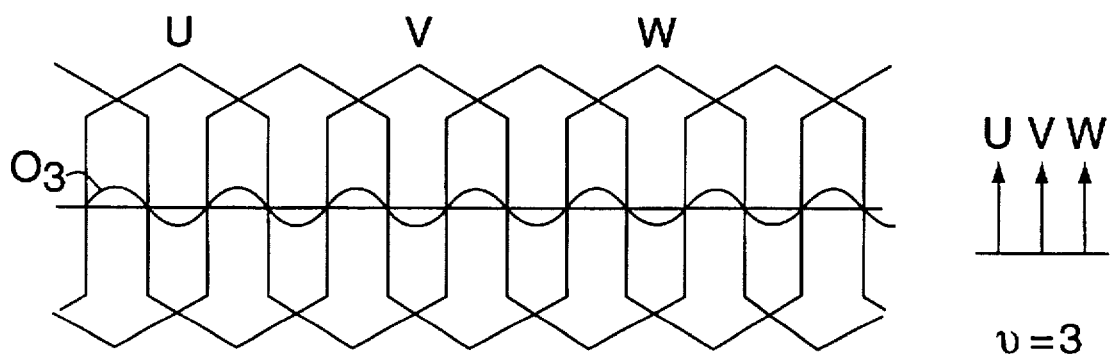
FIG. 2B
FIG. 2D

BRUSHLESS SYNCHRONOUS MACHINE

BACKGROUND OF THE INVENTION

1. Field of the Invention

The present invention relates to a brushless synchronous machine having an exciter, whose field excitation winding is powered via a regulator connected to a separate multi-phase designed auxiliary winding in the stator of the main machine.

2. Discussion of the Prior Art

The German Laid Open Application 27 14 188 discloses a synchronous machine that is used as a generator.

In the case of a synchronous generator of the type shown in the German Application above, a problem arises in supplying the field excitation winding of the exciter with sufficient energy in all operating states. This can be done by providing an auxiliary exciter with a permanent-magnet rotor to supply the exciter. Moreover, to reduce the outlay for supplying the exciter, it is possible to power the field excitation winding of the exciter from the main machine. For this purpose, voltages are diverted from the winding of the main machine, for example, and in addition, current transformers are connected, which are fed with the load current of the main machine. A circuit arrangement of this type enables the exciter to be supplied with energy during no load running, as well as in the case of normal load, and in the event of a short-circuit.

German Laid Open Application No. 27 14 188 discloses configuring an additional auxiliary winding in the stator of the main machine and of supplying the exciter with the energy gained from this, via a regulator.

However, a problem occurs in the arrangement described above, particularly in the event of a short-circuit, when the terminal voltage of the generator and the fundamental wave of the field in the air gap nearly disappear. In that case, the residual magnetic field permeating the air gap of the main machine is essentially made up of odd-order harmonic components, of which, for example, the component of the third harmonic wave, given The usual formation of the poles, is normally quite large.

When an auxiliary winding is used, however, depending on its design, not all harmonic waves are able to be effectively utilized to energize the excitation winding. For example, the relative phase relation of the a.c. voltages induced in the individual phases can be so unfavorable for certain harmonic waves that, on the whole, the phase-to-phase voltage is too low for powering the exciter.

U.S. Pat. No. 3,479,543 discloses an electrical machine having an auxiliary winding for excitation, whose design is directed to the effective utilization of the magnetic cross-field of the machine.

Great Britain Parent No. 2,011,186 discloses an auxiliary winding, which is designed as a multi-phase winding and operated as a single-phase winding, with which a third harmonic wave is supposed to be utilized. However, the single-phase operation of that device results in such a strong pulsation or ripple factor of the supply voltage that this voltage is not utilized very effectively.

The object of the present invention is to create a simple auxiliary winding, which will enable the largest possible component of the energy-rich, low-order harmonic waves, in particular the third harmonic wave, to be effectively utilized to generate a supply voltage for the exciter.

The object of the present invention is solved by providing an auxiliary winding with a number of phases that differ from the harmonic number of the harmonic wave of the field of the main machine that is the most salient in the event of a short circuit.

For a conventionally designed pole formation for a 3-phase synchronous generator of a few MVA power output, in a four- or five-phase auxiliary winding, comprised of only one or two turns, an a.c. voltage is induced in each phase by the normally heavily salient third harmonic wave, whose phase-to-phase voltage suffices to adequately supply the exciter in the event of a short circuit. Thus, as the result of the design in accordance with the present invention, a minimum outlay results for the auxiliary winding as a means for supplying energy to the exciter system.

One advantageous refinement of the present invention provides for the auxiliary winding to have a four-or five-phase design, and in particular a five-phase design. A five-phase winding allows the third harmonic wave to be utilized quite effectively. A larger number of phases for the auxiliary winding, for example seven or eight, can also be advantageous.

Another advantageous refinement of the present invention provides for the phases of the auxiliary winding to be linked in a star connection. A star connection avoids the problems that can occur in the case of a polygon connection due to compensating currents circulating in the phases when there is an unfavorable phase relation of the induced voltages.

The present invention can also be advantageously designed so that the phases of the auxiliary winding are connected in a polygon connection and in that, as the result of the spatial distribution of the auxiliary winding and/or the formation of the rotor poles, the harmonic wave, whose harmonic number corresponds to the number of phases of the auxiliary winding, is suppressed.

If the individual phases of an n-phase auxiliary winding are connected in a simplex or multiplex (single- or multi-strand) polygon connection, then when designing the generator, particularly when designing the auxiliary winding and/or the pole form, care should be taken to ensure that the n-th harmonic wave supplies a smallest possible component. Otherwise, in the case of an n-phase auxiliary winding in a polygon connection, this harmonic wave would produce unwanted, additional losses within the auxiliary winding due to the in-phase condition of the a.c. voltages produced in the phases as The result of compensating currents.

Moreover, a further development of the present invention can provide for the phases of the auxiliary winding to each have turns with different coil pitches. By use of The device of the present invention, the fundamental wave can be optimally utilized to supply energy to the excitation circuit during normal operation and, the selected harmonic wave can be optimally utilized to do the same in the event of a short circuit.

Another refinement of the present invention provides for the phases of the auxiliary winding to have half-integral numbers of turns. In this embodiment, the connection ends of the individual phases are arranged on the various front ends of the machine. This design makes it possible to produce a voltage that lies between those voltages capable of being generated by integral numbers of turns. Depending on the nature of the regulator of the exciter and the boundary conditions of the machine, it may be necessary to feed such intermediate voltage values to the regulator.

Another advantageous refinement of the present invention provides for individual turns of the auxiliary winding not to extend over the entire length of the laminated core, but rather to be placed in part in ventilating ducts of the laminated core in a tangential and/or radial direction. In this manner, axially shortened coils and connection ends brought out radially through venting slots can be used in the laminated core.

Moreover, it can be advantageous for turns of the auxiliary winding to be designed on one part of their axial length with a first coil pitch and on the remainder of the length with a second coil pitch. These measures also serve to produce intermediate voltages, which are properly adapted in fine steps and which lie between those voltages which are attainable by integral numbers of turns.

Moreover, the present invention can be advantageously developed by disposing the auxiliary winding in the slots of the main winding at the slot bottom. By this arrangement, the auxiliary winding is able to be easily and securely attached inside the slots before the main winding is introduced.

The present invention can also be advantageously developed by disposing the auxiliary winding in the slots of the main winding on the side of the air gap. An auxiliary winding of the type described above can be retrofitted relatively simply, in particular in the case of finished machines.

A further advantageous refinement of the present invention provides that in each case the one coil side of the auxiliary winding is arranged on the side of the yoke, and the other coil side on the side of the air gap. A design of the type described above of the auxiliary winding is especially favorable when the coil pitch of the auxiliary winding is small compared to the pole spacing. As a result, the useful stray fields of the main generator winding can be utilized as current-dependent components. This is mainly advantageous in the event of a short-circuit, since the stray field intensities are quite strong then.

Another possibility for configuring the auxiliary winding entails in providing the stator yoke with at least partially surrounding loops. In place of the air-gap flux, the yoke flux is then detected.

In the case of the afore-mentioned embodiments, in the cast of which parts of the turns are situated on the slot bottom, one must be careful about The relative phase position between those voltage components induced by the slot stray field and those induced by the air-gap field.

Moreover, it can be advantageously provided for the auxiliary winding to extend into the end-winding space, in order to utilize end stray fields, particularly in the event of a short-circuit.

The individual winding phases of the auxiliary winding can also be advantageously distributed asymmetrically on the periphery of the stator. An arrangement of the type described above, in some instances, be not free from phase shift, and allows the auxiliary winding to be adapted in the individual case, for example, to a [stator/rotor] slot number of the main machine that is inappropriate for its number of phases, and/or permits certain harmonic waves to be utilized quite effectively.

BRIEF DESCRIPTION OF THE DRAWINGS

The invention will be described on the basis of the attached drawings, in which:

FIG. 1B shows the connection of the auxiliary winding to the voltage supply of the exciter;

FIGS. 2A–2D show a three-phase auxiliary winding with a schematic representation of the fundamental wave (FIG. 2A), as well as a schematic representation of the third harmonic wave (FIG. 2B), and phase diagrams of the auxiliary winding voltages (FIG. 2C) and auxiliary winding induced voltages (FIG. 2D)—after "(FIG. 2B)";

FIG. 3A shows a phase diagram for the auxiliary winding voltages.

DETAILED DESCRIPTION OF THE INVENTION

FIGS. 2A–2D show why, in a three-phase generator or motor with three main phases and a three-phase auxiliary winding, the third harmonic wave may not be used to power the exciter.

The windings of the three winding phases of the auxiliary winding are denoted by U, V and W.

The idealized sinusoidal fundamental field G is shown in FIG. 2A. In a known manner, three a.c. voltages, displaced in phase by 120° relative to one another, are applied To the winding phases. A phase diagram of these voltages U, V, W as shown in FIG. 2C.

FIG. 2B shows the phases of the auxiliary winding, as well as the third harmonic wave of the field of the machine. In each of the winding phases of the auxiliary winding, an a.c. voltage is induced by the third harmonic wave $O_3$. The three induced voltages U, V, W are all in phase, as shown in FIG. 2D.

As a result of the voltage induced by the third harmonic wave $O_3$, the phase-to-phase voltage between the three winding phases is equal to zero. As a result of the use of an auxiliary winding of the type described above, the third harmonic wave of the fundamental field cannot be used to power the exciter.

In the Figures described below, the numerals designate the individual stator slots in which the urns of the auxiliary winding are placed. The letters denote the individual winding phases.

Figure 1A:
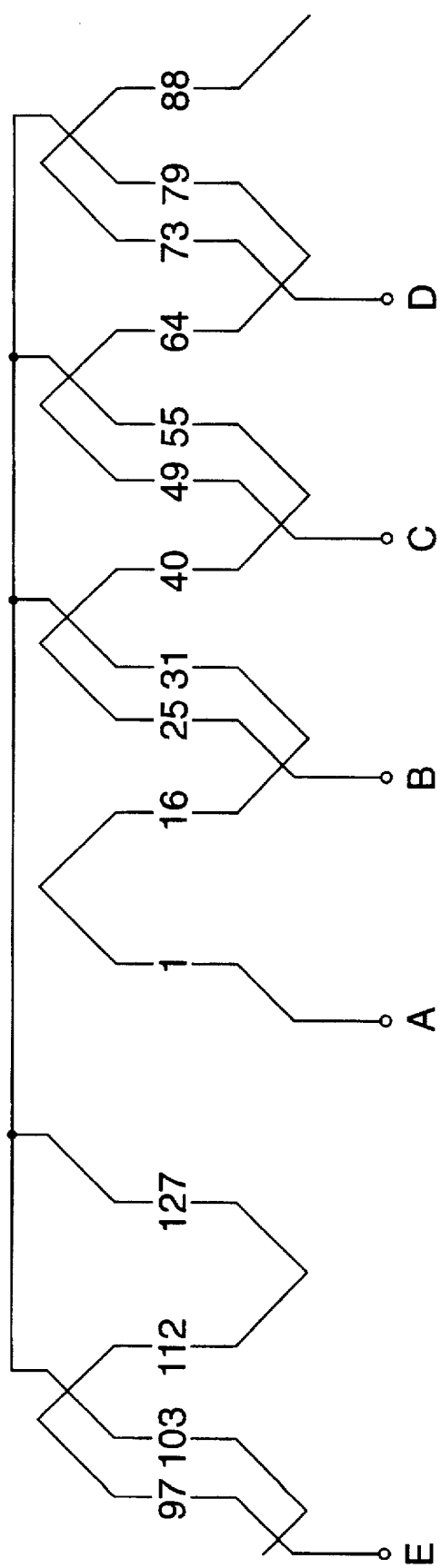
FIG. 1A, shows schematically, the arrangement of a five-phase auxiliary winding.

FIG. 1A shows a five-phase auxiliary winding for a 10-pole generator having 150 stator slots. The number of turns per phase amounts in each case to 1.5, so that the two connections of each phase are arranged at different ends of the machine. Since the coil pitch corresponds to the pole spacing, the complete number of turns per phase is effective both for the fundamental wave as well as for the third harmonic wave.

Figure 1C:
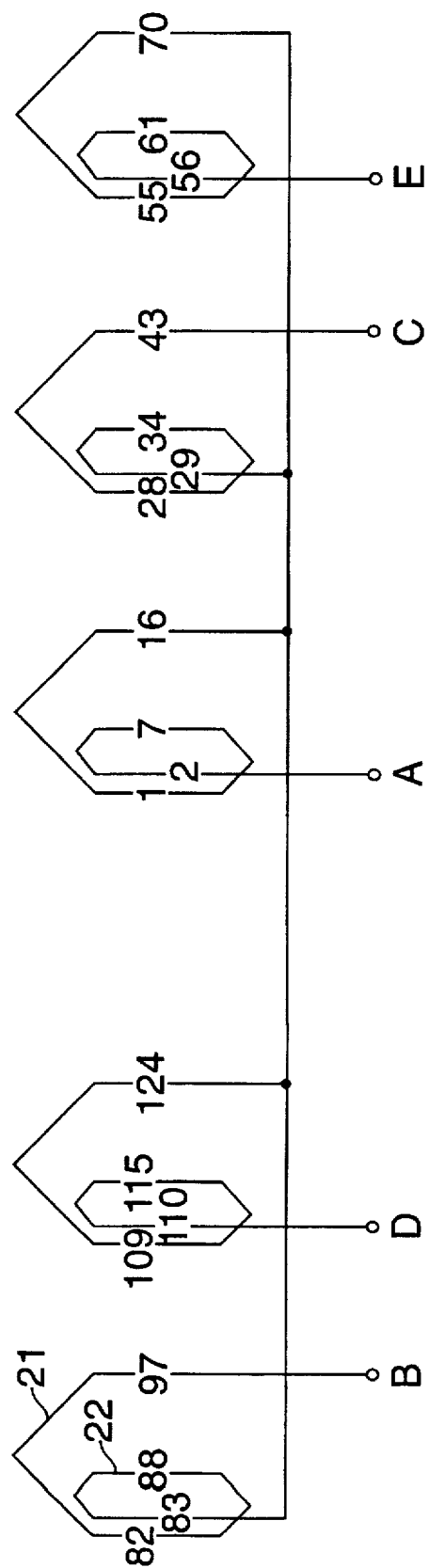
FIG. 1C, shows schematically, the arrangement of a five-phase auxiliary winding with turns having different coil pitches.

Another auxiliary winding is shown in FIG. 1C, in which each phase consists of two turns with different coil pitches. In this embodiment, compared to the embodiment of FIG. 1A, given a nearly unchanged effective number of turns for the fundamental wave, a clearly increased effective number of turns is attained in each case for the third harmonic wave. In the embodiments shown in FIGS. 1A and 1C, the phase relation for the phases of the auxiliary winding is the same both for the fundamental wave, as well as for the third harmonic wave.

FIG. 1B schematically depicts the connection of the five strands to a rectifier circuit. As a phase-to-phase voltage, this circuit supplies a relatively uniform 10-pulse d.c. voltage "d from the five phases, which is fed as a supply voltage via a regulator to the exciter. The auxiliary winding supplies the necessary minimum voltage both in normal operation through the fundamental wave, as well as in the event of a short-circuit through the third harmonic wave. When the generator is started, the initial excitation of the main machine is produced by magnetic remanence both in the main machine as well as in the exciter.

Figure 1D:
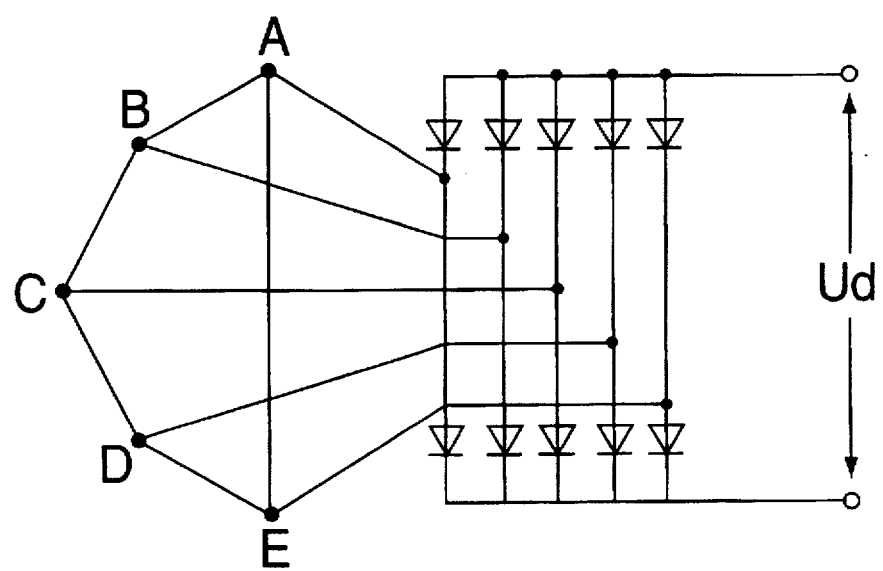
FIG. 1D shows the same arrangement, the star connection being replaced by a polygon connection.

FIG. 1D shows the same arrangement, the star connection being replaced by a polygon connection.

Figure 3:
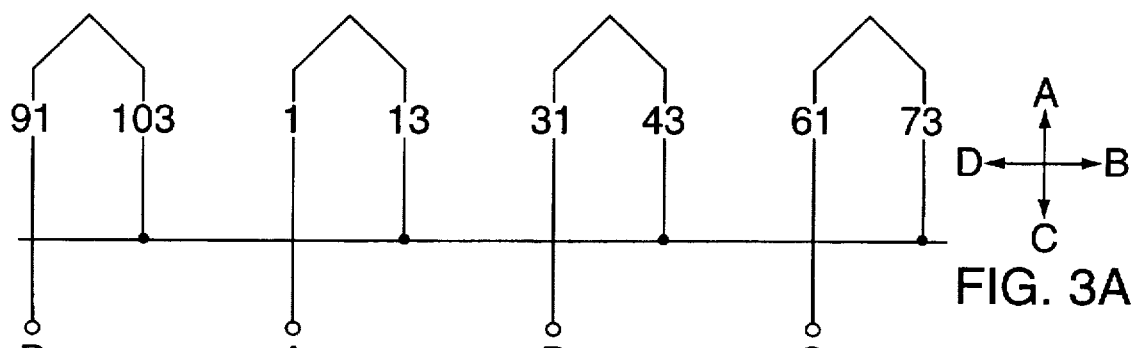
FIG. 3 shows a four-phase auxiliary winding.

FIG. 3 depicts a four-phase auxiliary winding, a 10-pole machine having 120 stator slots. The four phases are capable of being connected similarly to the manner shown in FIG. 1B for a five-phase auxiliary winding. The four-phase auxiliary winding generally supplies a more heavily pulsating (4-pulse) supply voltage "d than an auxiliary winding having more than four phases, since the relative phase relation of two phases is the same in each case (see FIG. 3A). For reasons of symmetry, however, due to the number of available slots, it can be more favorable, for example, to use a four-phase auxiliary winding instead of an auxiliary winding having more than four phases. In this case, the coil pitch likewise corresponds to the pole pitch and the effective number of turns amounts to one.

Figure 4A:
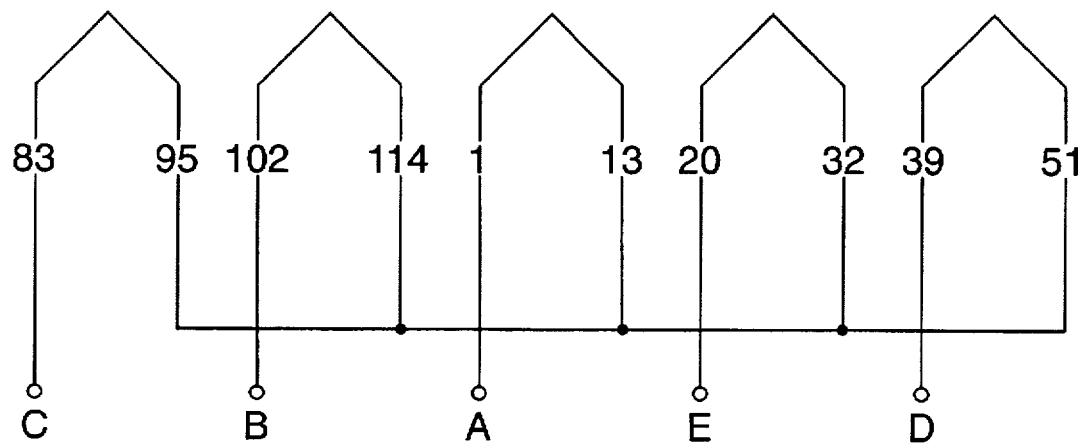
FIG. 4A shows an asymmetrically distributed five-phase auxiliary winding.

In the case of a 10-pole machine having 120 stator slots, as is shown in FIG. 3, FIG. 4 depicts an asymmetrical five-phase auxiliary winding as an advantageous alternative solution. The asymmetrical distribution of the five phases is necessary, because the five-phase auxiliary winding cannot be accommodated symmetrically in 120 slots. Because the phase relation of the individual phase voltages differs from that of a symmetrical arrangement, the fundamental wave and the third harmonic wave are utilized more effectively than in the case of a symmetrically arranged auxiliary winding in accordance with FIG. 3.

Figure 4B:
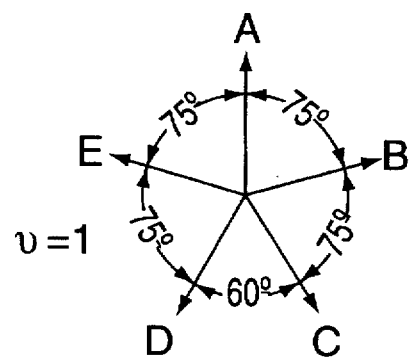
FIG. 4B shows the phase diagram of the fundamental wave (FIG. 4B) and third harmonic wave (FIG. 4C) of the winding of FIG. 4.
Figure 4C:
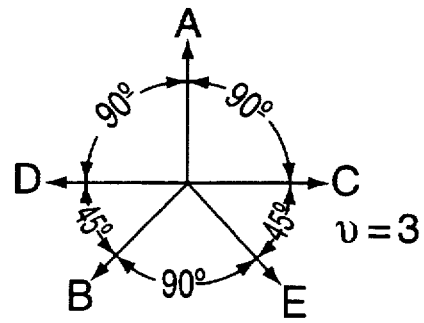

The phase diagrams in FIGS. 4B and 4C show that the relative phase relation of the phase voltages, both in the case of the fundamental wave (v=1, FIG. 4B), as well as in the case of the third harmonic wave (v=3, FIG. 4C) is more favorable for attaining a less-heavily pulsating d.c. voltage.

Figure 5:
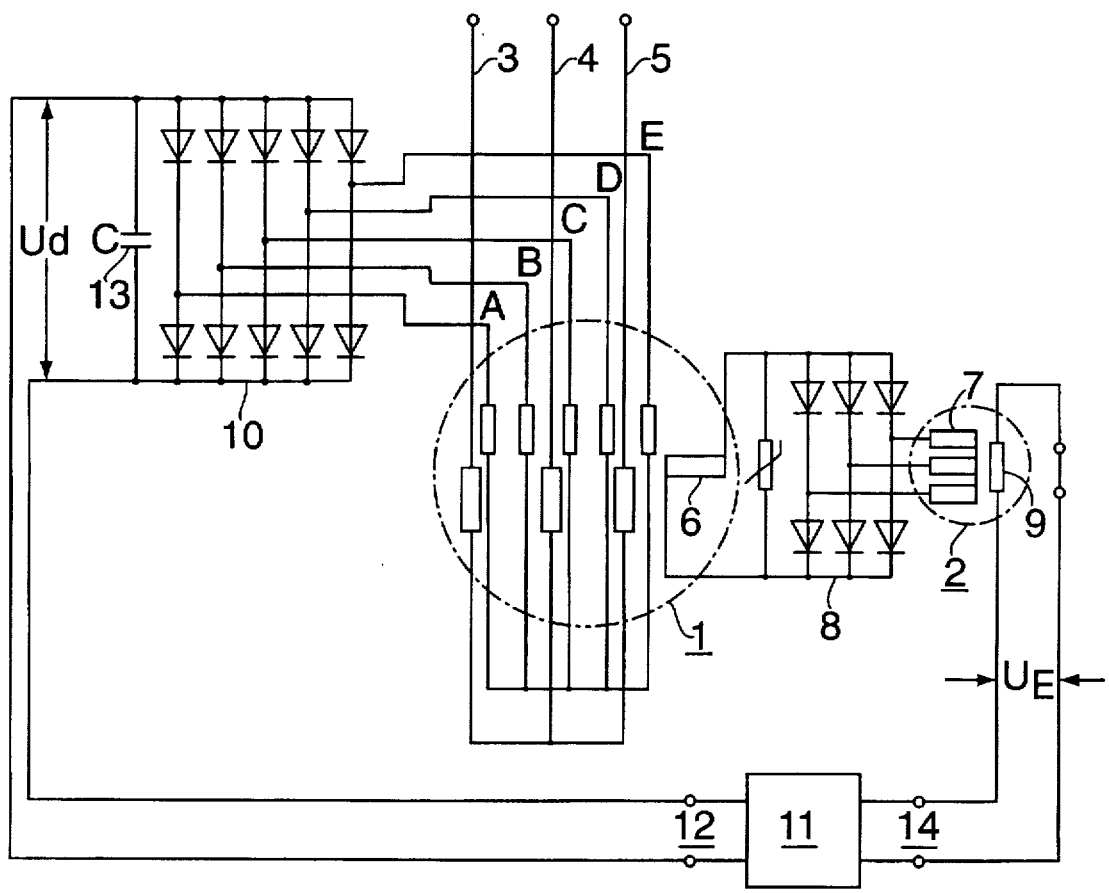
FIG. 5 shows a schematic representation of the interaction of the main and exciter machine.

FIG. 5 schematically depicts the main machine 1 and the exciter 2. In its stator, the main machine 1 has three phases 3, 4, 5 of a main winding, as well as five phases A, B, C, D, E of the auxiliary winding according to the invention. The rotor winding 6 of the main machine has a conventional design.

The winding 6 of the rotor of the main machine is supplied from the three-phase rotor winding 7 of the exciter 2 via a rectifier circuit 8. The stator winding 9 of the exciter 2 is supplied from the phases A, B, C, D, E of the five-phase auxiliary winding of the main machine 1 via a second rectifier circuit 10 and a voltage regulator 11. A capacitor 13 handles the filtering of the supply voltage "d supplied from the rectifier circuit 10 to the regulator connecting terminals 12. The excitation voltage $U_E$, which is less than or equal to the supply voltage "d supplied by the regulator 11, is fed at the terminals 14 into the stator winding 9 of the exciter 2.

Figure 6A:
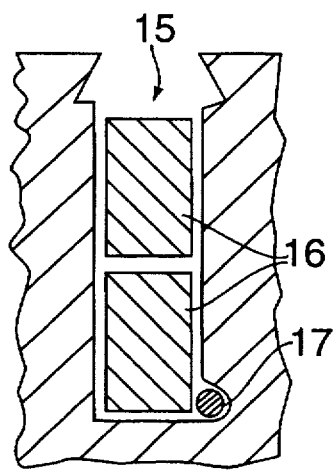
FIGS. 6A and 6B show the configurations of a turn of the auxiliary winding in a stator slot.

FIG. 6A depicts in cross-section a slot 15 in the stator of the main machine, comprising the coil sides of the two-layer main winding 16 and a turn 17 of the auxiliary winding accommodated at the slot bottom.

Figure 6B:
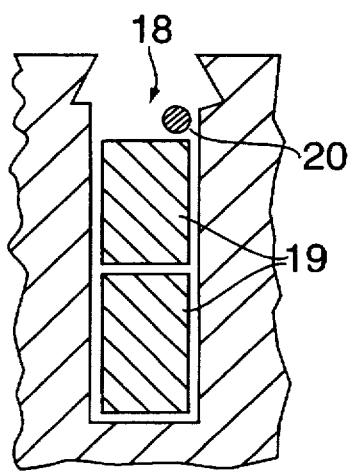

FIG. 6B depicts in cross-section a slot 18 in the stator of the main machine comprising a main winding 19 and a turn 20 of the auxiliary winding accommodated on the side of the air gap.

We claim:

1. A brushless, three-phase synchronous machine comprising:

an exciter, said exciter comprising only one field excitation winding, said field excitation winding being powered by a regulator, said regulator being connected to a separate auxiliary winding in a stator of a main machine, said auxiliary winding having a plurality of phases, a number of said phases of said auxiliary winding being different from a harmonic number of a most salient harmonic wave of a field of said main machine during a short circuit, said auxiliary winding operating in a multi-phase manner, said auxiliary winding having a four or five phase design, said auxiliary winding gaining excitation from a fundamental wave and from a third harmonic wave, said phases of said auxiliary winding having turns with different coil widths.

2. The brushless synchronous machine of claim 1, wherein:

said auxiliary winding has a four-phase design.

3. The brushless synchronous machine of claim 1, wherein:

said auxiliary winding has a five-phase design.

4. The brushless synchronous machine of claim 1, wherein:

said phases of said auxiliary winding are connected in a star connection.

5. The brushless synchronous machine of claim 1, wherein:

said phases of said auxiliary winding are connected in a polygon connection.

6. The brushless synchronous machine of claim 1, wherein:

said phases of said auxiliary winding have half-integral numbers of turns.

7. The brushless synchronous machine of claim 1, wherein:

said auxiliary winding is disposed in slots holding a main winding of said main machine, said auxiliary winding being disposed at a bottom of said slots.

8. The brushless synchronous machine of claim 1, wherein:

said auxiliary winding is disposed in slots holding a main winding of said main machine, said auxiliary winding being disposed at a portion of said slots adjacent an air gap.

9. The brushless synchronous machine of claim 1, wherein:

individual winding phases of said auxiliary winding are distributed asymmetrically on the periphery of the stator.

* * * * *